United States Patent
Gao et al.

(10) Patent No.: US 9,988,079 B2
(45) Date of Patent: Jun. 5, 2018

(54) INDEPENDENT STEERING MECHANISM OF CONTROLLABLE HYDRAULIC LOCKING TYPE FOR LEFT AND RIGHT WHEELS

(71) Applicant: Jilin University, Changchun (CN)

(72) Inventors: Bingzhao Gao, Changchun (CN); Haitao Ding, Changchun (CN); Hong Chen, Changchun (CN); Jianwei Zhang, Changchun (CN); Weinan Tao, Changchun (CN); Mengjian Tian, Changchun (CN)

(73) Assignee: Jilin University, Changchun (CN)

( * ) Notice: Subject to any disclaimer, the term of this patent is extended or adjusted under 35 U.S.C. 154(b) by 0 days. days.

(21) Appl. No.: 15/456,264

(22) Filed: Mar. 10, 2017

(65) Prior Publication Data

US 2018/0057044 A1    Mar. 1, 2018

(30) Foreign Application Priority Data

Aug. 26, 2016 (CN) .......................... 2016 1 0737588

(51) Int. Cl.
*B62D 7/10* (2006.01)
*B62D 5/04* (2006.01)
(Continued)

(52) U.S. Cl.
CPC ............. *B62D 5/0484* (2013.01); *B62D 3/04* (2013.01); *B62D 5/043* (2013.01); *B62D 5/046* (2013.01);
(Continued)

(58) Field of Classification Search
CPC .. B62D 5/0484; B62D 5/0481; B62D 5/0487; B62D 5/0421; B62D 5/046; B62D 5/0478; B62D 7/1509; B62D 7/1581
(Continued)

(56) References Cited

U.S. PATENT DOCUMENTS 3,202,238 A * 8/1965 Strader .................. B62D 7/142
                                                          180/403
3,696,881 A * 10/1972 Gordon .................... B62D 5/09
                                                          180/411

(Continued)

FOREIGN PATENT DOCUMENTS

CN      205075885 U      3/2016
CN      205113422 U      3/2016
(Continued)

*Primary Examiner* — Tony H Winner
(74) *Attorney, Agent, or Firm* — Venable LLP; Henry J. Daley

(57) ABSTRACT

An independent steering mechanism of controllable hydraulic locking type for left and right wheels is provided. The independent steering mechanism includes a power steering mechanism, a steering drive mechanism, a hydraulic locking mechanism and an electronic control unit. Power of the left and right steering motors flows through the worm, the worm gear, the gear to drive left and right racks to translate. Outer ends of the left and right racks are connected to left and right tie rods via spherical hinges respectively. Inner ends of the left and right racks are connected to a piston rod and a cylinder barrel via spherical hinges respectively. A left chamber and a right chamber in the hydraulic cylinder are connected to an oil reservoir via an electro-hydraulic valve. The left and right steering motor controllers for the left and right steering motor and the electro-hydraulic valve controller are communicated via CAN bus.

9 Claims, 2 Drawing Sheets

(51) Int. Cl.
 *B62D 3/04* (2006.01)
 *B62D 6/10* (2006.01)
 *B62D 6/02* (2006.01)
 *B62D 6/00* (2006.01)

(52) U.S. Cl.
 CPC ......... *B62D 5/0421* (2013.01); *B62D 5/0478* (2013.01); *B62D 6/002* (2013.01); *B62D 6/02* (2013.01); *B62D 6/10* (2013.01)

(58) Field of Classification Search
 USPC .......................................... 180/411, 412, 410
 See application file for complete search history.

(56) References Cited

U.S. PATENT DOCUMENTS

| | | | | |
|---|---|---|---|---|
| 5,348,111 | A * | 9/1994 | Williams | B62D 6/00 180/410 |
| 7,325,818 | B1 * | 2/2008 | Kwon | B60G 3/22 280/86.75 |
| 2007/0240928 | A1 * | 10/2007 | Coltson | B62D 7/1509 180/411 |
| 2010/0241314 | A1 * | 9/2010 | Bohm | B62D 7/1581 701/41 |
| 2011/0284313 | A1 * | 11/2011 | Jungbecker | B60G 7/006 180/444 |
| 2016/0227698 | A1 * | 8/2016 | Ballu | B62D 7/1509 |
| 2016/0339953 | A1 * | 11/2016 | Park | B62D 7/1581 |

FOREIGN PATENT DOCUMENTS

| | | | |
|---|---|---|---|
| CN | 205168618 U | 4/2016 | |
| JP | 2009101858 A | 5/2009 | |

* cited by examiner

INDEPENDENT STEERING MECHANISM OF CONTROLLABLE HYDRAULIC LOCKING TYPE FOR LEFT AND RIGHT WHEELS

This application claims priority to a Chinese patent application No. 201610737588.8 filed on Aug. 26, 2016, disclosures of which is incorporated herein by reference in their entireties.

TECHNICAL FIELD

The present disclosure relates to the field of mechanical engineering, and in particular, to an independent steering mechanism with hydraulic locking mechanism for left and right wheels.

BACKGROUND

With a trend of intelligent vehicles and electric vehicles, the mechanical structure of traditional vehicles has changed. Independent steering mechanism for left and right wheels arises at the historic moment. The steering mechanism can be applied to vehicles of various structures, especially suitable for distributed drive electric vehicles. The distributed drive electric vehicles can be four-wheel driven independently, have more control degree of freedom, and the security, power performance and stability of the vehicles can be improved with a reasonable control algorithm. Therefore, this kind of vehicles has been widely studied. As for the realization of the structure of the distributed drive electric vehicle, each wheel is equipped with a wheel hub/wheel rim driving system, and the steering system may be a traditional steering mechanism or an independent steering mechanism, so that the motion of the vehicle can be better controlled by four-wheel independent steering and independent driving.

In a China Patent CN 205075885 U, a steering motor is vertically disposed above a wheel which can realize four-wheel independent driving and improve stress condition of the steering mechanism. However, there is no locking mechanism on the left wheel and right wheel. Therefore, once a certain steering motor malfunctions, the steering function can not be achieved. In CN205113422U, a switch between independent steering to integral steering is achieved by engagement of slots and teeth. However, a process of the engagement is not smooth and the response is slow, which will affect driving feelings. Moreover, due to lacking a mechanical connection between a self-locking mechanism and a steering wheel, the system is hard to maintain the direction under the interference of the outside world.

Independent steering for the left wheel and right wheel makes the control of the vehicles more flexible. Tire wearing can be reduced and driving stability of the vehicles can be improved by modifying steering angles of left wheel and right wheel separately. However, there are still some technical problems required to be solved. The steering motor has poor ability to withstand external interference, thus a transmission device with a special mechanical structure or of high reverse efficiency is needed. Under some specific conditions, the left steering wheel and the right steering wheel are required to be switched from an independent motion to an integral motion. Due to cancellation of the mechanical connection between the steering wheel and a steering tie rod, the steering system cannot work normally when a motor on one side is broken. Therefore, a redundant design is required for the steering system, so as to improve fault-tolerant capacity of the steering system.

SUMMARY

To solve the problems described in the "BACKGROUND", the present disclosure proposes an independent steering mechanism of controllable hydraulic locking type for left wheel and right wheels. The present disclosure aims to control the motion of left and right steering wheels independently, and under specific conditions, enable the left and right steering wheels to move together through a mechanical connection by a hydraulic locking mechanism. The steering mechanism is suitable for traditional cars, hybrid vehicles, electric vehicles. However, for the sake of system arrangements and design goals, the steering mechanism proposed by the present disclosure is primary suitable for distributed electric vehicles with four-wheel independent driving and independent steering.

According to the steering system proposed by the present disclosure, left wheels and right wheels can be steered separately, which can meet requirements for special steering conditions (such as spot turn) of the vehicles. Based on original steering trapezium, the position of steering wheels can be modified by a precise control of the motors, which reduces tire wearing. When the steering motors break down, a left rack and right rack can be locked up with a hydraulic device. Due to the redundant design, the operating reliability of the system is improved. Moreover, the response of electronic hydraulic control is fast, which meets rapid response requirements of vehicles.

The function of the mechanism proposed by the present disclosure is realized mainly by means of a power steering mechanism, steering driving mechanism, hydraulic locking mechanism, electronic control unit. The mechanism mainly includes a steering motor, worm gear reducer, gear-rack transmission mechanism, hydraulic cylinder, solenoid valve, steering tie rod, electromagnetic clutch, controllers of the steering motor and the solenoid valve.

A left steering motor and a right steering motor of the mechanism are fixed on a shell of the power steering mechanism. Output shaft of the left and right steering motor are connected to a worm via a coupler respectively. A worm gear and a gear are coaxial and connected via an electromagnetic clutch, and are fixed on the shell of the power steering mechanism via a bearing. The power of the left and right steering motors flows through the worm, the worm gear, the gear to drive left rack and right rack to translate. Outer ends of the left and right rack are coupled to a left tie rod and a right tie rod via spherical hinges respectively. Inner ends of the left and right rack are coupled to a piston rod and a cylinder barrel of a hydraulic cylinder via spherical hinges respectively. The shell of the power steering mechanism and a connection baseboard of the steering mechanism are mounted on a subframe.

Oil outlets of a left chamber and a right chamber in the hydraulic cylinder are connected to an electro-hydraulic valve. The other end of the electro-hydraulic valve is connected to oil reservoir fixed to a vehicle body. The electro-hydraulic valve is controlled by an electro-hydraulic valve controller to be closed or opened, so as to realize the independent motion of the left and right steering wheels and the integral motion of the left and right steering wheels.

A left steering motor controller and a right steering motor controller for the left and right steering motor and the electro-hydraulic valve controller are communicated via CAN bus.

A rubber bushing is disposed between the shell and the baseboard to reduce an external impact on the steering system.

The worm gear and the gear are coaxial, and can rotate together and rotate separately by the close or open of the electromagnetic clutch.

There are lubricants on the spherical hinges and the left and right racks. A dust cover is provided at the spherical hinges and the left and right racks, and a joint of the shell and the left and right racks.

An angle and torque of the steering wheel, vehicle speed signal are sent to the CAN bus by sensors. The left and right steering motor controller and the electro-hydraulic valve controller receive messages from the CAN bus and send out corresponding instructions, so as to control the motion of the left and right steering motor, actions of the electro-hydraulic valve and electromagnetic clutch.

Compared with the traditional steering mechanism, the above solution of the present disclosure has the following technical effects:

In a process of vehicle running, the steering wheels are disturbed by the road surface. As for the traditional steering mechanism, the driver will clench the steering wheel against interference from the road. In the present disclosure, the mechanical connection between the steering wheel and the racks is canceled. Therefore, if a normal gear reducer is adopted in the steering motor, the steering wheels will change their original position under external interference. Due to hysteresis and overshoot in motor controlling, the steering wheels may wiggle constantly under the external interference even if they are returned to an expected position by adjusting the torque of the motor. Thus, the system is unstable, which is not allowed in a vehicle design. Therefore, a self-locking device is required in the steering system, so that the external interference will not have much impact on the positions of the steering wheels. In view of this, a worm and worm gear reducer is adopted in the steering motors. The helix angle of the worm is normally small, thus self-locking easily occurs. The reduction ratio of the reducer is large, which is helpful for reducing overall size of the motor, and the worm and worm gear reducer has low noise and stable transmission. Thus, the driving is made more comfortable. However, according to such structure, the wheels cannot return to center automatically due to low reverse efficiency. Therefore, steering motors are required to work in a process of returning to center.

In the traditional steering mechanism, the relative position relationship between the left steering wheel and the right steering wheel is controlled via the steering trapezium, the design of which is a compromise design and can not ensure that the left and right steering wheels move around a same center at any time. On the other hand, the independent steering system of the left and right steering wheels can control a rotation angle of the left wheel and the right wheel separately, which ensures a better coordinating motion of the left and right wheel and reduces tire wearing.

When a turning angle of a certain steering wheel is changed actively, a force effected on the tire by the road and a turning track of the vehicles are also changed correspondingly. Therefore, the track of the vehicles can be modified by independent steering of the left and right wheel. When the vehicle is in an emergency situation, such as losing directional stability, the steering system can work cooperated with an Electronic Stability Program (ESP) system to improve running security of the vehicle.

The shell of the power steering mechanism is connected to the connecting baseboard via the rubber bushing. The rubber bushing can reduce the impact on the steering effected by the road interference. Hydraulic cylinder and racks are coupled via spherical hinges to avoid extra force and torque on the hydraulic cylinder caused by a change of the relative position between the left and right rack.

When the independent steering system needs to switch to the integral motion from the independent motion, for example, when the steering motor on one side breaks down, the electro-hydraulic valve is powered on, there is no fluid circulating in the left and right chambers of the hydraulic cylinder, thus the left rack and right rack move together.

LIST OF REFERENCE NUMERALS

1: left steering motor; 2: dust cover; 3: electro-hydraulic valve; 4: hydraulic cylinder; 4a: piston rod; 4b: cylinder barrel; 5: oil reservoir; 6: right steering motor; 7: worm; 8: worm gear; 9: shell of power steering mechanism; 10: right rack; 11: right steering tie rod; 12: gear; 13: right steering motor controller; 14: electro-hydraulic valve controller; 15: left steering motor controller; 16: steering mechanism connection baseboard; 17: left steering tie rod; 18a: spherical hinge I; 18b: spherical hinge II; 18c: spherical hinge III; 18d: spherical hinge IV; 19: left rack; 20: electromagnetic clutch.

DETAILED DESCRIPTION

Specific contents and embodiments of the present disclosure are further described below in combination with accompanying drawings.

Figure 1:
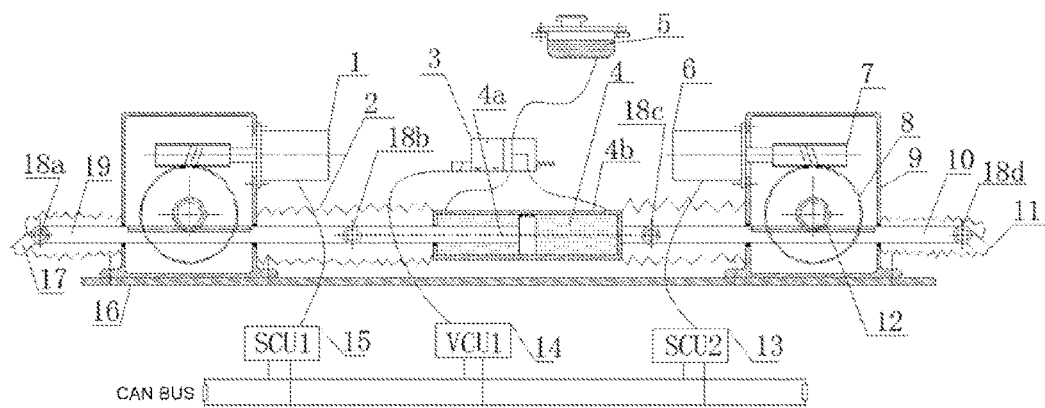
FIG. 1 is a schematic diagram illustrating a device provided by the present disclosure.
Figure 2:
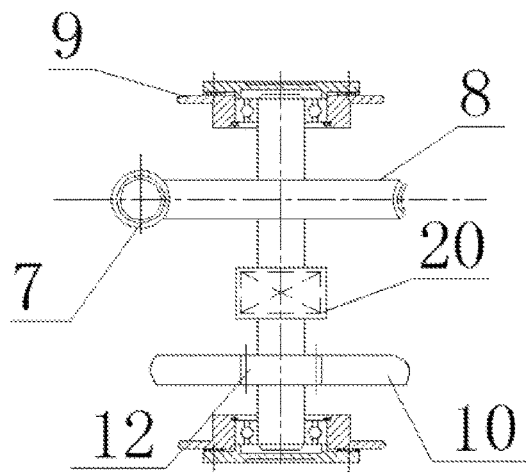
FIG. 2 is a schematic diagram illustrating a transmission shaft at a worm gear of the device provided by the present disclosure.

Referring to FIG. 1 and FIG. 2, which illustrate an implementing solution of a kind of structure of the mechanism provided by the present disclosure, including a left steering motor 1, a dust cover 2, an electro-hydraulic valve 3, a hydraulic cylinder 4, a piston rod 4a, a cylinder barrel 4b, an oil reservoir 5, a right steering motor 6, a worm 7, a worm gear 8, shell 9 of a power steering mechanism, a right rack 10, a right steering tie rod 11, a gear 12, a right steering motor controller 13, an electro-hydraulic valve controller 14, a left steering motor controller 15, a steering mechanism connection baseboard 16, a left steering tie rod 17, a spherical hinge 18, a left rack 19, an electromagnetic clutch 20.

Referring to FIG. 1 and FIG. 2, the left steering motor 1 and right steering motor 6 are fixed to the shell 9 of the power steering mechanism. The worm gear 8 and gear 12 are connected via an electromagnetic clutch 20, and are fixed on the shell 9 of the power steering mechanism via a bearing. The power of the motors flows through the worm 7, the worm gear 8, the gear 12 to drive the left rack 19 and right rack 10 to translate. A left end of the left rack 19 is coupled to the left tie rod 17 via the spherical hinge 18a, and a right end of the left rack 19 is coupled to the piston rod 4a via the spherical hinge 18b. A left end of the right rack 10 is coupled to the cylinder barrel 4b of the hydraulic cylinder 4 via the spherical hinge 18c, and a right end of the right rack 10 is coupled to the right steering tie rod 11 via the spherical hinge 18d. The spherical hinges increase freedom degrees of the motion of the system, prevents kinematic interference caused by the jitter and steering of the wheels. A rubber bushing is disposed between the shell 9 of the power steering mechanism and the connection baseboard 16 of the steering mechanism to reduce an impact on the steering system by externality. The independent motion and integral motion of the left and right steering wheels can be realized by controlling the turning on and off of the electro-hydraulic valve 3. The whole steering system are fixed on the subframe via the connection baseboard 16 of the steering mechanism.

Figure 3:
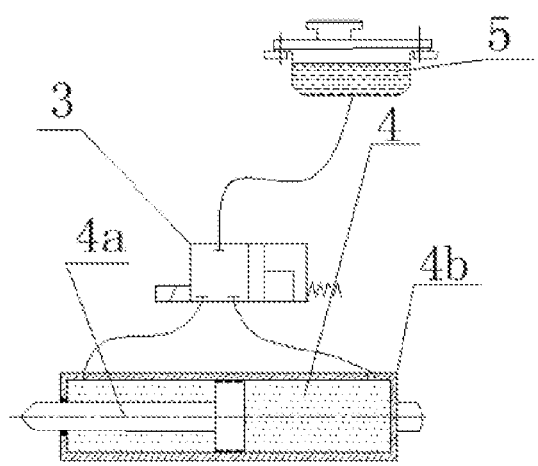
FIG. 3 is a schematic diagram illustrating a hydraulic system when the device provided by the present disclosure is locked.

As shown in FIG. 1, when the electro-hydraulic valve 3 is powered off, the left and right chambers of cylinder 4 are connected to the oil reservoir 5. The piston rod 4*a* can freely move relative to the cylinder barrel 4*b*. The left rack 19 and right rack 10 can move relative to each other. Therefore, an independent steering of the left wheel and right wheel can be realized. When the electro-hydraulic valve 3 is powered on, under the electromagnetic force, the electro-hydraulic valve 3 overcomes the spring force and reaches a working condition as shown in FIG. 3. At this time, no fluid flows between the left and right chambers of the hydraulic cylinder 4 and the oil reservoir 5. The piston rod 4*a* is stationary relative to the cylinder barrel 4*b*, thus there is no relative displacement between the left rack 19 and right rack 10. Therefore, the left and right steering wheels are switched to the integral motion from the independent motion. When it is required to switch the left and right steering wheels to the independent motion from the integral motion, the electro-hydraulic valve 3 is powered off. As a result, under the action of a return spring, the electro-hydraulic valve 3 restores to the working condition as shown in FIG. 1.

As shown in FIG. 1, in normal working conditions, the electro-hydraulic valve 3 is powered off. When a vehicle is driving in a straight line, due to the self-locking of the worm and worm gear mechanism, the vehicle can keep driving in a straight line even if it is under the external interference.

As shown in FIG. 1, when the vehicle makes a turn, the electro-hydraulic valve 3 is powered off. The left and right steering motor controllers 15, 13 receive signals such as the vehicle speed, angle and torque of the steering wheel from the CAN bus, and compute the angles rotated by the left and right steering motors 1, 6 according to a preset control algorithm. In addition, the left and right steering motor controllers 15, 13 control the positions of the left and right steering motors 1, 6, so as to make them turn a corresponding angle. Then, the left and right steering motors 1, 6 drive the worm gear 8 to rotate via the worm 7. At this moment, the electromagnetic clutch 20 is in a closed state. The worm gear 8 drives the gear 12 to rotate, and then the gear drives the racks to move in a straight line. The left and right rack 19, 10 have different displacement through a relative motion between the piston rod 4*a* and the cylinder barrel 4*b*. The left and right racks 19, 10 drive the left and right steering tie rods 17, 11 to move. The left and right steering tie rods are connected to knuckles. The knuckles drive the steering wheels to rotate around a master pin so as to realize the steering motion.

When the vehicle makes a turn, the left and right steering motor controllers 15, 13 receive information such as the angle of the steering wheel and the vehicle velocity from the CAN bus. Based on the geometry of the current steering trapezium, in view of side slip characteristics of the tire, turning angle of the left steering wheel and right steering wheel can adjusted separately, so as to guarantee centers of the tracks of the steering wheels coincide. Therefore, the wearing of the tires will be reduced.

When the vehicle is in an emergency (e.g., emergency obstacle avoidance, yaw velocity rapidly increasing due to over-steering or losing control of the vehicle), the left and right steering motor controllers 15, 13 determine the occurrence of abnormal conditions based on information from the CAN bus, such as yaw velocity, vehicle speed. If abnormal conditions happen, the controllers adjust turning angles of the steering motors to modify the driving track of the vehicle. The process can combine with ESP system to improve active security of vehicle.

When the vehicle requires to be in special steering conditions, such as spot turn, front axle-rear axle steering, the controllers controls the turn angles of the steering motors based on a preset control strategy.

As shown in FIGS. 2, 3, when the steering motors on one side break down, due to the self-locking characteristic of the worm gear transmission, the rack cannot drive the worm 7 to rotate via the gear 12 and worm gear 8. At this moment, the electromagnetic clutch 20 on the side that is break down releases, meanwhile the electro-hydraulic valve 3 is powered on. Therefore, the left rack 19 and the right rack 10 are locked together. As a result, the undamaged steering motor drives the left and right steering wheels to rotate.

In conclusion, the mechanism provided by the present disclosure can realize independent motion of the left and right steering wheels, and can be locked under specific working conditions. The whole steering system has great controllability and operational reliability.

What is claimed is:

1. An independent steering mechanism of controllable hydraulic locking type for left and right wheels, comprising a power steering mechanism, a steering drive mechanism, a hydraulic locking mechanism and an electronic control unit, wherein left and right steering motors are fixed on a shell of the power steering mechanism, an output shaft of the left and right steering motors is connected to a worm via a coupler respectively, a worm gear and a gear are coaxial and connected via an electromagnetic clutch, and are fixed on the shell of the power steering mechanism via a bearing; a power of the left and right steering motors flows through the worm, the worm gear, the gear to drive left and right racks to translate, outer ends of the left and right racks are connected to left and right tie rods via a spherical hinge and a spherical hinge respectively; inner ends of the left and right racks are connected to a piston rod and a cylinder barrel of a hydraulic cylinder via a spherical hinge respectively; the shell of the power steering mechanism and a connection baseboard of the steering mechanism are mounted on a subframe;

oil outlets of a left chamber and a right chamber of the hydraulic cylinder are connected to an electro-hydraulic valve, and the other end of the electro-hydraulic valve is connected to an oil reservoir fixed to a vehicle body; the electro-hydraulic valve is controlled by an electro-hydraulic valve controller to be closed or opened, so as to realize an independent motion of the left and right steering wheels and an integral motion of the left and right steering wheels;

left and right steering motor controllers for the left and right steering motor and the electro-hydraulic valve controller are communicated via CAN bus.

2. The independent steering mechanism of controllable hydraulic locking type for left and right wheels according to claim 1, wherein a rubber bushing is disposed between the shell and the baseboard so as to reduce an external impact on the steering system.

3. The independent steering mechanism of controllable hydraulic locking type for left and right wheels according to claim 2, wherein the worm gear and the gear are coaxial, and can rotate together and rotate separately by close or open of the electromagnetic clutch.

4. The independent steering mechanism of controllable hydraulic locking type for left and right wheels according to claim 2, wherein there are lubricants on the spherical hinges and the left and right racks; a dust cover is provided at the spherical hinges and the left and right racks, and a joint of the shell of the power steering mechanism and the left and right racks.

5. The independent steering mechanism of controllable hydraulic locking type for left and right wheels according to claim 2, wherein an angle and torque of the steering wheel and a vehicle speed signal are sent to the CAN bus by sensors; the left and right steering motor controllers and the electro-hydraulic valve controller receive corresponding messages from the CAN bus and send out corresponding instructions, so as to control the motion of the left and right steering motors, the actions of the electro-hydraulic valve and the electromagnetic clutch.

6. The independent steering mechanism of controllable hydraulic locking type for left and right wheels according to claim 1, wherein there are lubricants on the spherical hinges and the left and right racks; a dust cover is provided at the spherical hinges and the left and right racks, and a joint of the shell of the power steering mechanism and the left and right racks.

7. The independent steering mechanism of controllable hydraulic locking type for left and right wheels according to claim 1, wherein the worm and the worm gear are adopted as a decelerating mechanism.

8. The independent steering mechanism of controllable hydraulic locking type for left and right wheels according to claim 1, wherein an angle and torque of the steering wheel and a vehicle speed signal are sent to the CAN bus by sensors; the left and right steering motor controllers and the electro-hydraulic valve controller receive corresponding messages from the CAN bus and send out corresponding instructions, so as to control the motion of the left and right steering motors, the actions of the electro-hydraulic valve and the electromagnetic clutch.

9. The independent steering mechanism of controllable hydraulic locking type for left and right wheels according to claim 1, wherein the worm gear and the gear are coaxial, and can rotate together and rotate separately by close or open of the electromagnetic clutch.

* * * * *